United States Patent [19]

Elias

[11] Patent Number: 5,467,073

[45] Date of Patent: Nov. 14, 1995

[54] SYSTEM FOR THE PROTECTION AND SAFETY OF CARS, PASSENGERS AND PEDESTRIANS

[76] Inventor: Jorge V. Elias, Avenida Insurgentes Sur 505 Suite 502, Colonia Napoles, Mexico, 03810 D.F.

[21] Appl. No.: 133,535

[22] Filed: Oct. 7, 1993

[51] Int. Cl.$^6$ .................................................. B60Q 1/50
[52] U.S. Cl. ...................... 340/464; 340/467; 340/479
[58] Field of Search ................................... 340/464, 467, 340/479, 468, 469, 472

[56] References Cited

U.S. PATENT DOCUMENTS

| | | | |
|---|---|---|---|
| 3,911,394 | 10/1975 | Shames | 340/467 |
| 4,034,338 | 7/1977 | Bevilacqua | 340/464 |
| 4,280,116 | 7/1981 | Camp | 340/464 |
| 4,470,036 | 9/1984 | Doerr et al. | 340/464 |
| 5,043,698 | 8/1991 | Tabacchi | 340/467 |
| 5,119,067 | 6/1992 | Adell | 340/468 |
| 5,253,115 | 10/1993 | Ueno | 340/464 |

FOREIGN PATENT DOCUMENTS 1049113  2/1979  Canada ................................... 340/467

*Primary Examiner*—Brent Swarthout
*Attorney, Agent, or Firm*—Pennie & Edmonds

[57] ABSTRACT

A system for the protection and safety of cars, passengers and pedestrians is described, adaptable to be installed in automotive vehicles having a gas pedal, a brake pedal and a battery, such as cars, tractors, trailers, trucks, buses, and the like. The system consists of a green light accelerator circuit which is energized when the driver presses the gas pedal, closing the contacts of its relay and lighting up its green light focus and is disenergized when the gas pedal is released opening the contacts of its relay so its green light focus goes out; a red light brake circuit which is energized when the driver presses the brake pedal, closing the contacts of its auxiliary relay and lighting up its red light focus, and is disenergized when the brake circuit is released, opening the contacts of its auxiliary relay so its red light focus goes out; and a white light sensor circuit which is energized by light entering the white light sensor, which is preferably covered by a small plastic tube, closing the contacts of its relay and lighting up its white light focus, and is disenergized when the sensor is no longer stimulated, opening the contacts of its relay so the white light focus goes out; and a first, second and third housings for housing the green light accelerator circuit, the red light brake circuit, and the white light sensor circuit.

21 Claims, 3 Drawing Sheets

SYSTEM FOR THE PROTECTION AND SAFETY OF CARS, PASSENGERS AND PEDESTRIANS

FIELD OF THE INVENTION

The present invention is related to vehicle signaling devices and, more exactly, to a system for the protection and safety of cars, passengers and pedestrians.

BACKGROUND OF THE INVENTION

At present, even austere vehicles have signaling and lighting systems, such as high and low beams; parking, backup and flashing red lights; amber or yellow left and right turn signals manual and automatic door, dome, dashboard, interior, trunk and hood lights; as well as lighters, etc. Some automobiles also come equipped with search lights and light towers, light and sound systems, fog lights, etc.

Presently, vehicles do not include easily visible and detectable signaling systems for special incidents, accidents, emergencies, etc., producing countless automotive accidents involving partial or total loss of vehicles, partial or total injury to persons and, on many occasions, death, much to the dismay of the laws and economy of any country.

SUMMARY OF THE INVENTION

Taking into consideration each and every one of the disadvantages of the preceding situation, as well as many more unmentioned, the inventor of the present invention has run a countless number of studies, practice runs, tests and experiments leading him to design a completely-new system for the protection and safety of passengers and pedestrians which will overcome the disadvantages of previous solutions and provide numerous advantages, which are, by all means, of the utmost importance in the area of engineering involving this invention.

The present invention's system for the protection and safety of passengers and pedestrians consists of an electronic green-light accelerator circuit, an electronic red-light brake circuit, and an electronic white light sensor circuit, highly safe and reliable when operating and when off. The circuits are respectively located in small housings which can be mounted either inside or outside the cap of the vehicle, connecting the accelerator and brake warning lamps to the central and top part of the front windshield and the sensor warning lamp to the top half of the rear windshield.

The system can be connected to the dashboard or similar part of any automotive vehicle such as automobiles, buses, trucks, tractor trailers, etc. The system is made entirely from inexpensive components commonly found on the market. Should it break down, it can be repaired quickly and easily. The green-light accelerator circuit is energized when the driver steps on the pedal, green light goes on and, when the drives lets up on it, the green light goes out.

The green light serves in the present invention among other things, to signal the drivers of other vehicles and/or pedestrians out in front that the vehicle provided with the present invention is moving forward. For example, if, at a crossing, the traffic light turns red and the vehicle in question continues rolling, other drivers and/or pedestrians will be able to take the proper precautions. There could be several possible problems:

1. The driver in question may be distracted or under the influence of some illness, alcohol, drugs, etc.
2. Something may be wrong with the brakes of the vehicle.
3. There may be a real emergency (rushing someone to the hospital, helping someone in serious trouble, getting away from an assailant, etc.).
4. The vehicle is going down a street, highway or narrow bridge or one being repaired, a single lane, etc.

The red-light brake circuit is energized by means of the brake pedal. When the driver steps on it, the red light goes on and, when it is released, the red light goes out.

The red-light tells other drivers and/or pedestrians that the vehicle in question is braking or at a complete halt. Other drivers and/or pedestrians can pass in front of the vehicle without risking an accident, etc.

The white light sensor circuit is connected to the dashboard or similar. It is energized manually from a button on the dashboard. When needed, it is pressed briefly for one or two seconds. The white light goes on and, upon release, off. The white light signals the driver of the trailing vehicle that the reflection of the high beams in the rear view mirrors is blinding the driver of the vehicle in question, etc.

DETAILED DESCRIPTION OF THE INVENTION

Figure 1:
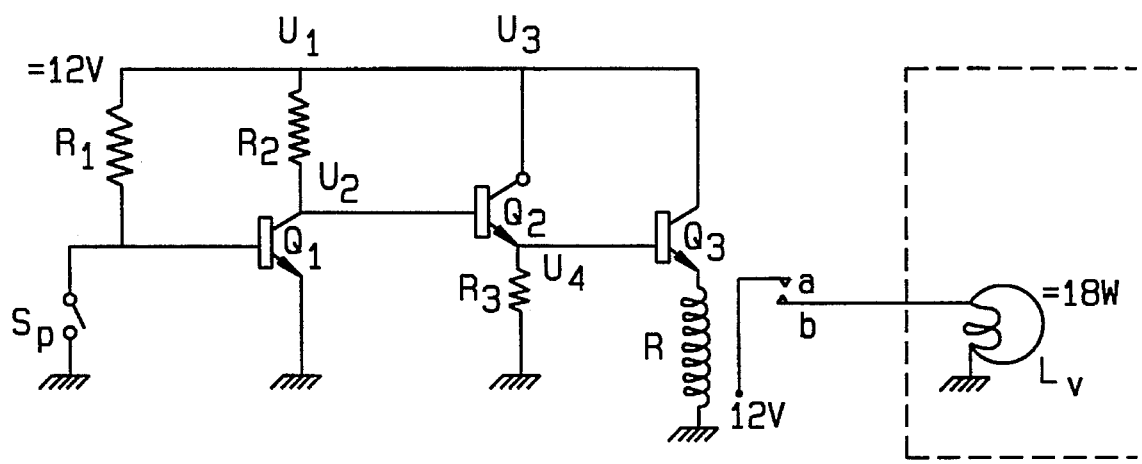
FIG. 1 shows the green-light accelerator circuit for the system for the protection and safety for passengers and pedestrians of the present invention.

In the preferred presentation, the system for the protection and safety of cars, passengers and pedestrians in the present invention is formed by a green-light accelerator circuit (FIG. 1) connected to a battery (not illustrated), consisting of three NPN-type transistors, $Q_1$, $Q_2$ and $Q_3$. The base electrode of transistor $Q_1$ is connected to point U, joining a grounded accelerator sensor $S_p$ and a resistance $R_1$. The other end of the latter is connected at point $U_1$, also joining resistance $R_2$. Voltage for transistor $Q_1$'s base electrode is approximately 12 volts. The collector electrode of transistor $Q_1$ is connected at point $U_2$, joining resistance $R_2$ and the base electrode of transistor $Q_2$, with the emitter electrode of transistor $Q_1$ grounded. The collector electrode of transistor $Q_2$ is connected at point $U_3$, joining resistance $R_2$ at point $U_1$ and the collector electrode of transistor $Q_3$, with emitter electrode of transistor $Q_2$ connected at point $U_4$, joining grounded resistance $R_3$ and the base electrode of transistor $Q_3$. The emitter electrode of transistor $Q_3$ is connected to grounded relay R. A green light bulb $L_v$ of approximately 18 watts is connected to relay R. Voltage for the emitter electrode of transistor $Q_3$ is approximately 12 volts.

In this preferred presentation, the system for the protection and safety of passengers and pedestrians likewise includes: a red-light brake circuit (FIG. 2), connected to a battery (not illustrated), consisting of a brake relay P with a voltage of approximately 12 volts. Connected to it, in a switchable manner, is an auxiliary relay $R_a$ of a voltage of approximately 12 volts, also joining a red light bulb $L_r$ of approximately 18 watts.

Figure 3:
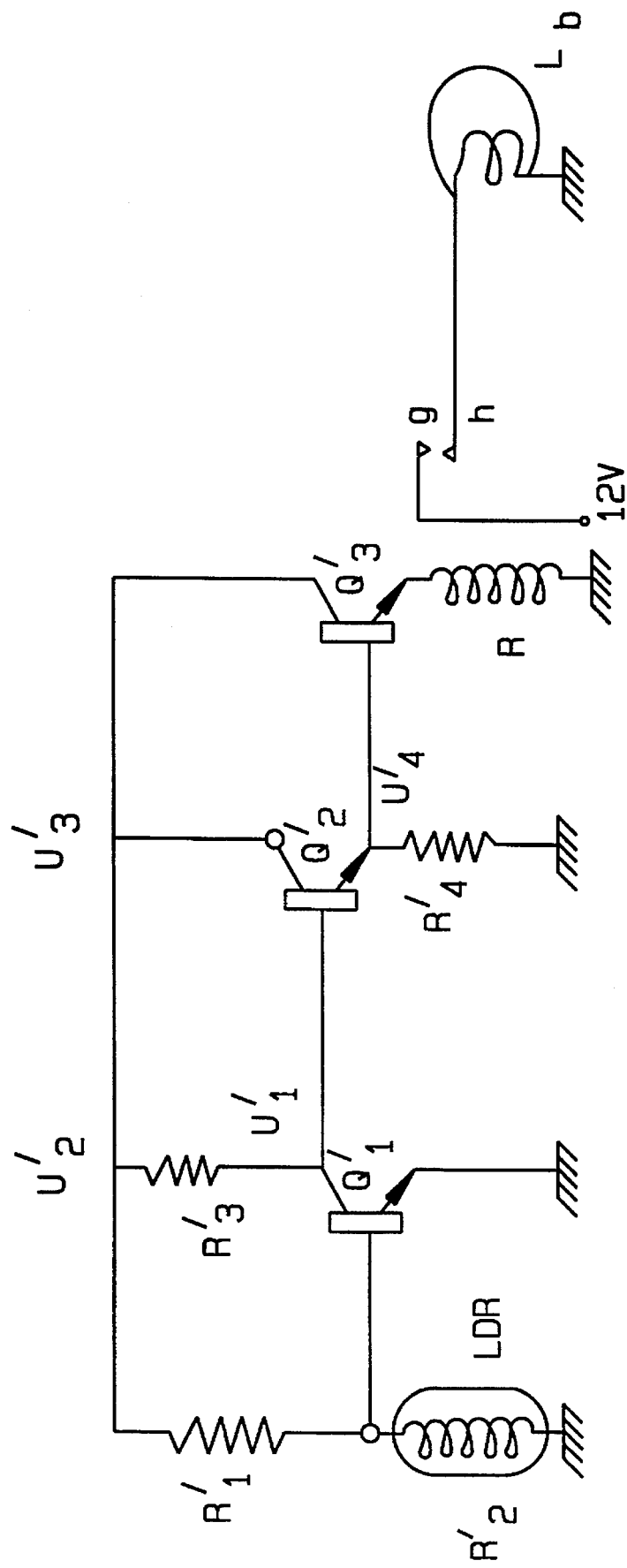
FIG. 3 shows a white light sensor circuit of the same system.

In the system, there is a white light sensor circuit, (FIG. 3) connected to the battery (not illustrated), consisting of three NPN-type transistors $Q'_1$, $Q'_2$ and $Q'_3$. The base electrode of transistor $Q'_1$ is connected at point $U'$, also joining a resistance $R'_1$ and a LDR white light sensor with a resistance $R'_2$. The white light LDR sensor is also grounded. The emitter electrode of transistor $Q'_1$ is grounded, while the collector electrode of this same transistor $Q'_1$ is connected at point $U'_1$, joining the base electrode of transistor $Q'_2$ and a resistance $R'_3$, which is, in turn, joining to point $U'_2$, joining resistance $R'_1$ and point $U'_3$, which connect the collector electrodes of transistors $Q'_2$ and $Q'_3$. Emitter electrode of transistor $Q'_2$ is connected at point $U'_4$, joining the grounded resistance $R'_4$ and the base electrode of transistor $Q'_3$. The emitter electrode of transistor $Q'_3$ is joined to relay $R'$, likewise connecting a white light bulb $L_b$. The voltage of the emitter electrode of transistor $Q_3$ is approximately 12 volts.

Figure 2:
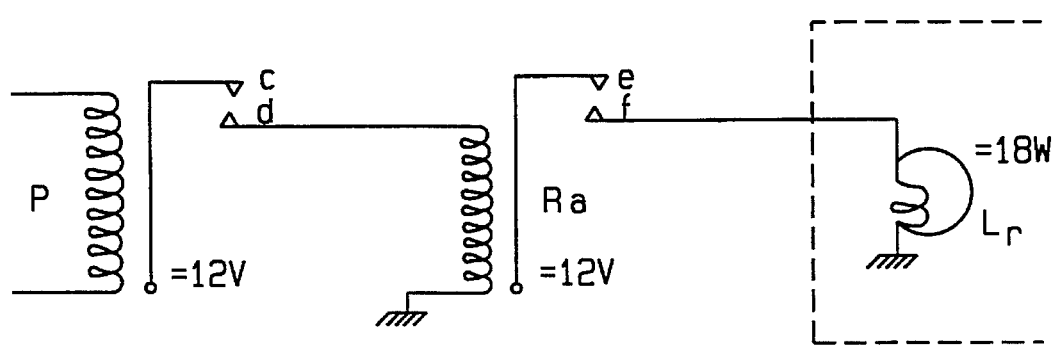
FIG. 2 shows a red-light brake circuit of the same system.
Figure 4:
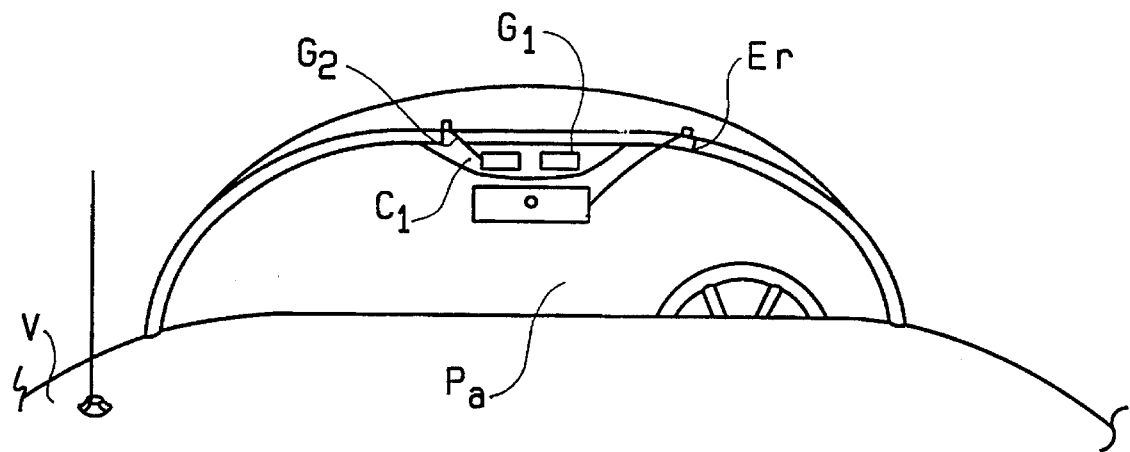
FIG. 4 is a full view of the front of the vehicle. The front windshield hosts a housing containing the green-light accelerator circuit (FIG. 1) and another with a red-light brake circuit (FIG. 2)

FIG. 4 shows the front end of vehicle V, with a front windshield $P_a$ with rearview mirror $E_r$. A housing $G_1$ holding the green-light accelerator circuit $L_v$ (FIG. 1) and a housing $G_2$ holding the red-light brake circuit $L_r$ (FIG. 2).

Figure 5:
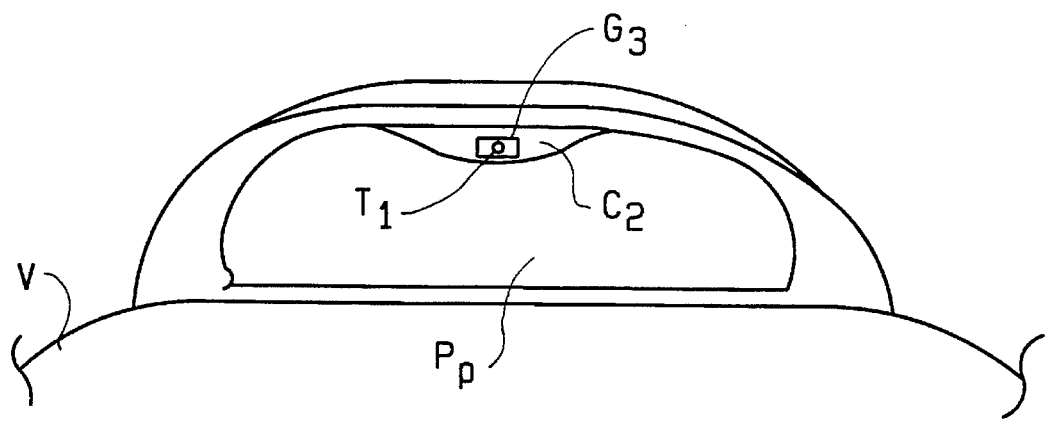
FIG. 5 is a full view of the rear end of a vehicle. The back windshield hosts a white light sensor circuit (FIG. 3).

FIG. 5 shows the rear end of vehicle V, with a back windshield $P_p$ with a housing $G_3$, containing the white light sensor circuit $L_b$ (FIG. 3) with tube, $T_1$, around the body of the high-beam LDR sensor.

When the driver of a vehicle steps on the gas pedal, the pedal sensor $S_p$ (FIG. 1) closes the circuit of the grounded base electrode of transistor $Q_1$, said transistor $Q_1$. When $Q_1$ is cut off in cut off, the voltage in the base electrode of transistor $Q_2$ is approximately 12 volts, by which transistor $Q_2$ remains in a saturation state. In the present invention, transistor $Q_3$ acts as an emitter follower. The voltage of the emitter electrode of transistor $Q_3$ is approximately 12 volts direct current. With it, relay R connected to that emitter electrode is energized, closing contacts a and b of the secondary winding of relay R and turning on the green indicator light $L_v$, in housing $G_1$ (FIG. 4).

If the driver's foot releases the gas pedal, transistor $Q_1$ remains in a saturation state, so that both transistors $Q_2$ and $Q_3$ are immediately cut off, leaving inoperative relay R and the accelerator green light $L_v$ indicators is gone out.

When the driver of a vehicle presses the brake pedal, the red light indicator $L_v$ in the housing $G_2$ located at the front of the vehicle light up because of a relay closing the circuit, thanks to a pressure switch in the brake master cylinder. The same voltage used for the taillights is used in the system of lights for the protection and safety of the present invention. It is used to close contacts e and f of the primary winding of auxiliary relay $R_a$, which is used to close the red-light brake indicator circuit $L_r$ located in the front part of the vehicle in housing $G_2$ (FIG. 4). When the brake pedal is released, the entire circuit is deactivated and red light indicator $L_r$ also remains out. Auxiliary relay $R_a$ is optional because the red-light indicator $L_r$ can be connected in parallel to the taillight system, if and when the brake relay P with its contacts c and d has the capacity to feed a red light bulb focus of approximately 18 watts.

In the case the trailing vehicle has its high-beams on, blinding the driver of the vehicle with the present system, the white light sensor LDR of the sensor circuit (FIG. 3) will drop its value enough for transistor $Q'_1$ to be cut off, with transistors $Q'_2$ and $Q'_3$ remaining in a saturation state, activating relay $R'$ of light $L_b$ when its primary winding is energized by closing contacts g and h. In turn, white light indicator $L_b$ located in the rear part of the vehicle V in housing $G_3$ (FIG. 5), lights up.

If there is no bright-light stimulus or there is a total absence of light, transistor $Q'_1$ remains in a saturation state and transistors $Q'_2$ and $Q'_3$ are in a cut off position, with which relay $R'$ of white light bulb $L_b$ is not energized and the respective light white bulb goes off. In order to guarantee that only very direct white bright-light stimuli, such as those from vehicle high beams, coming on the back of the vehicle in question activate the LDR sensor of the circuit in FIG. 3, this circuit includes a small plastic tube, covering the body of the white light LDR sensor, to avoid light coming in from the side. Moreover, there is a variable resistance $R'_1$ connected to the base electrode of transistor $Q'_1$. Adjusting the right value of said variable resistance $R'_1$, the LDR sensor of the circuit should be sensitive enough and respond adequately to successive stimuli of blinding direct light.

The green-light accelerator circuit and the red-light brake circuit are housed in housing $G_1$ and $G_2$, respectively, and the housings $G_1$ and $G_2$ are mounted on the front windshield $P_a$ of vehicle V, above to the rearview mirror $E_r$ (FIG. 4). The white light sensor circuit is housed in housing $G_3$ and mounted in the housing $G_3$ on the back windshield $P_p$ of vehicle V at the medium top part.

The accelerator, brake and white light sensor circuits are connected to a commutable connection of the vehicle V's fuse panel, which is switched by a starter switch passing through a 10-amp fuse previously installed in the vehicle. If this type of fuse panel does not exist, the respective connection should be modified to meet this goal or add a bypass fuse for each of the accelerator, brake and white light sensor circuits, such as those used in car radios. The light focus used in the accelerator, brake and white light sensor circuits are GE 1141 or equivalents. They are mounted in sockets or bayonet caps expressly designed to be used with a reflecting screen to be located behind a matching plastic honeycomb.

The mounting for the accelerator, brake and white light sensor circuits may form part of a housing similar to that at the rear of vehicles from 1992 on, indicating the brakes are being pressed.

It will be clear to experts in this area that a host of changes and modifications can be made to this invention, without deviating from the spirit and scope defined under the following claims.

I claim:

1. A system for the protection and safety of passengers and pedestrians, adaptable to vehicles having a gas pedal and a brake pedal, comprising:

(a) a green-light accelerator circuit connected to the gas pedal and consisting of a pedal sensor, a first, second and third transistor, wherein each transistor comprises a base electrode, a collector electrode and an emitter electrode, a first, second and third resistance, a first relay, and a first light bulb, mounted on vehicle structure visible from in front of the vehicle;

(b) a red-light brake circuit connected to the brake pedal and consisting of a brake relay, an auxiliary relay and a second light bulb, mounted on vehicle structure visible from in front of the vehicle;

(c) a high-beam sensor circuit consisting of a high-beam sensor, which is covered by a tube to guarantee that said sensor is only activated by stimulation by direct light, and is not activated by lateral light, fourth, fifth and sixth transistors, wherein each transistor comprises a base electrode, a collector electrode and an emitter electrode, fourth, fifth, sixth and seventh resistances, wherein the fourth resistance is a variable resistor connected to the high-beam sensor, and adjusted to a setting to guarantee that the high-beam light sensor will only respond to light from high-beams, a second relay and a third light bulb, mounted on vehicle structure visible from behind the vehicle; and (d) a first, second and third housing to hold, respectively, the green-light accelerator circuit, the red-light brake circuit, and the high-beam sensor circuit.

2. A system for the protection and safety of passengers and pedestrians, in accordance with claim 1, in which the first, second, third, fourth, fifth and sixth transistors are type NPN.

3. A system for the protection and safety of passengers and pedestrians, in accordance with claim 1, in which, in the green-light accelerator circuit:

(a) the base electrode of the first transistor is connected to a first point together with the pedal sensor, which is grounded, and the first resistance;

(b) the first resistance is connected to a second point joining a second resistance;

(c) the voltage of the base electrode of the first transistor is approximately 12 volts, (d) the collector electrode of the first transistor is connected to a third point joining the second resistance and the base electrode of the second transistor;

(e) an emitter electrode of the first transistor is grounded;

(f) a collector electrode of the second transistor is connected to a fourth point, joining the second resistance, through the second point, and the collector electrode of the third transistor;

(g) the emitter electrode of the second transistor is connected to a fifth point, joining the third resistance, which is grounded, and a base electrode of the third transistor;

(h) the emitter electrode of the third transistor is connected to the first relay having first and second grounded contacts;

(i) the first relay is connected, in turn, to the first light bulb for the green light, of approximately 18 watts; and (j) the voltage of the emitter electrode of the third transistor is approximately 12 volts.

4. A system for the protection and security of passengers and pedestrians, in accordance with claim 1, in which, in the red-light brake system:

(a) the brake relay includes third and fourth contacts and is of a voltage of approximately 12 volts;

(b) the brake relay is connected as a switch to the auxiliary relay having fifth and sixth contacts, the voltage being approximately 12 volts, and (c) the second light bulb for red light is approximately 18 watts.

5. A system for the protection and security of passengers and pedestrians, in accordance with claim 1, in which, in the high-beam sensor circuit:

(a) the base electrode of the fourth transistor is connected to a sixth point, joining the fourth resistance and the light sensor with the fifth resistance;

(b) the high-beam sensor is grounded, as is the emitter electrode of the fourth transistor;

(c) the collector electrode of the fourth transistor is connected to a seventh point, joining the base electrode of the fifth transistor and the sixth resistance;

(d) the sixth resistance is linked to a eighth point, connecting the fourth resistance and a ninth point joining collector electrodes of the fifth and sixth transistors;

(e) the emitter electrode of the fifth transistor is connected to a tenth point, joining the seventh resistance, which is grounded, and the base electrode of the sixth transistor;

(f) the emitter electrode of the sixth transistor is connected to the second relay, including seventh and eighth contacts and having, likewise connected there, the third light bulb, of approximately 12 watts; and (g) the voltage of the emitter electrode of the sixth transistor is approximately 12 volts.

6. A system for the protection and security of passengers and pedestrians, in accordance with claim 1, in which the green-light accelerator circuit is located in the first housing and mounted on the vehicle's front windshield, close to the rearview mirror.

7. A system for the protection and security of passengers and pedestrians, in accordance with claim 1, in which the red-light brake circuit is located in the second housing and mounted on the vehicle's front windshield, close to the rearview mirror.

8. A system for the protection and security of passengers and pedestrians, in accordance with claim 1, in which the sensor circuit is located in the third housing and mounted on the vehicle's rear windshield.

9. A system for the protection and security of passengers and pedestrians, in accordance with claim 1, in which:

(a) when the vehicle's gas pedal is pressed, the pedal sensor closes the circuit of the base electrode of the first transistor, interrupting this first transistor;

(b) the voltage in the base electrode of the second transistor is nearly 12 volts;

(c) the second transistor remains in a saturation state and the third transistor operates as an emitter follower;

(d) the emitter electrode of the third transistor has a voltage of approximately 12 volts direct current;

(e) the first relay is charged, closing the first and second contacts of its primary winding and, therefore, lighting the first accelerator light bulb; and (f) when the gas pedal is released, the first transistor remains in a saturation state; immediately interrupting the second and third transistors and deactivating the first relay and immediately turning off the first accelerator light bulb.

10. A system for the protection and security of passengers and pedestrians, in accordance with claim 1, in which:

(a) when the brake pedal is pressed, the fourth and fifth contacts of the auxiliary relay are closed, which, in turn, closes the brake-light indicator circuit, lighting the second light bulb of the brake light; and (b) when the brake pedal is released, it immediately deactivates the entire brake circuit, instantly turning off the second brake light bulb.

11. A system for the protection and security of passengers and pedestrians, in accordance with claim 1, in which:

(a) when the high-beam sensor circuit is activated by light entering the high-beam sensor, the power of the high-beam sensor drops to such a degree that the fourth transistor is interrupted, and the fifth and sixth transistors are immediately in a saturation state, activating the second relay, closing the seventh and eighth contacts, and immediately lighting the third light bulb; and (b) if there is no bright-light stimulus or there is a total absence of light, the fourth transistor is in a saturation state and the fifth and sixth transistors are interrupted, with which the second relay is discharged and the third light bulb is turned off.

12. A system for the protection and safety of cars, passengers and pedestrians, adaptable to be connected to a vehicle having a gas pedal, a brake pedal and a battery, the system comprising:

a green-light accelerator circuit connected to the battery, for signaling the drivers of other vehicles and/or pedestrians out in front of this vehicle that it is moving forwards, the green-light accelerator circuit being adapted to be mounted in the central top part of the vehicle front windshield, housed in a first housing, and consisting of a pedal sensor, first, second and third transistors; the pedal sensor being connected by a first joining point to a first base electrode transistor, which is connected by its collector electrode to the second base electrode transistor, the second transistor being connected by its emitter electrode to the third base electrode transistor; first, second and third resistances; a first relay, and a first green-light bulb, the first relay being connected to the third emitter electrode transistor and being connected also to the same in a commutable manner to the first green-light bulb, and when the green-light accelerator circuit is activated by the driver pressing the gas pedal, the pedal sensor closes the circuit of the base electrode of the first transistor, cutting off the first transistor and the second transistor goes into saturation with a voltage in its base electrode of about 12 volts, and the third transistor operating as an emitter follower, which emitter electrode also has a voltage of approximately 12 volts in direct current, whereby the first relay is charged, closing the first and second contacts of its primary winding and lighting the green-light bulb; and when the green-light accelerator circuit is deactivated upon the release of the gas pedal by the driver, the first transistor goes into saturation, the second and third transistors are cut off, and the first relay is deactivated and turns off the first green-light bulb; a red-light brake circuit connected to the battery for signaling to other drivers and/or pedestrians that this vehicle is braking or at a complete halt, the red-light brake circuit being adapted to be mounted in the central top part of vehicle front windshield, housed in the second housing and consisting of a brake relay, auxiliary relay, and a second red-light bulb, the brake relay being connected in a commutable manner to the auxiliary relay which is connected also in a commutable manner to the second red-light bulb, and when the red-light brake circuit is activated when the driver presses the brake pedal, the fourth and fifth contact of the auxiliary relay are closed, which, in turn, closes the brake-light indicator circuit, lighting the red-light bulb, and, when the brake pedal is released, it deactivates the entire brake circuit, turning off the second red-light bulb; and a white-light sensor circuit connected to the battery for signalling the driver of the trailing vehicle that its white-light beams are blinding the driver of this vehicle, the white-light sensor circuit being connected to a dashboard and adapting it to be mounted to the central top part in the vehicle rear windshield housed in a third housing, and comprising a white-light sensor, and fourth, fifth and sixth transistors, the white-light sensor circuit being connected to the fourth transistor by its collector electrode to the fifth base electrode transistor having its emitter electrode connected to sixth transistor, a fourth, fifth, sixth and seventh resistances, a second relay and a third white-light bulb, the second relay being connected thereto in a commutable manner to the white-light bulb, and, when this white-light sensor circuit is activated manually from the dashboard and light enters the sensor, the power of the white-light sensor drops to a degree that the fourth transistor cuts off, and the fifth and sixth transistors are in saturation activating the second relay, closing the seventh and eight contacts and lighting the white-light bulb; and if there is no bright light stimulus or there is a total absence of light, the fourth transistor is in saturation and the fifth and sixth transistors cut off, whereby the second relay is discharged and the third white-light bulb turns off.

13. A system for the protection and safety of cars, passengers and pedestrians, in accordance with claim 12, in which the first, second, third, fourth, fifth and sixth transistors are type NPN.

14. A system for the protection and safety of cars, passengers and pedestrians, in accordance with claim 13, in which the pedal sensor is grounded, and by means of the first joining point is joined to the first resistance which is in turn connected by its other end to a second joining point joining the second resistance; the voltage of the base electrode of the first transistor being approximately 12 volts; the collector electrode of the first transistor is connected to a third joining point which joins the second resistance and the base electrode of the second transistor; the emitter electrode of the first transistor being grounded; the collector electrode on the second transistor is connected to the fourth joining point which joins the second resistance by means of the second joining point and the collector electrode of the third transistor; the emitter electrode of the second transistor being connected to a fifth joining point which joins the third resistance being grounded and the base electrode of the third transistor, the voltage of the emitter electrode of the third transistor being approximately 12 volts.

15. A system for the protection and security of cars, passengers and pedestrians, in accordance with claim 13, in which the brake relay and the auxiliary relay have a voltage of approximately 12 volts.

16. A system for the protection and security of cars, passengers and pedestrians, in accordance with claim 13, in which the base electrode of the fourth transistor is connected to a sixth joining point which joins the fourth resistance and the white-light sensor with the fifth resistance, the white-light sensor being grounded as is the emitter electrode of the fourth transistor; the collector electrode of the fourth transistor is connected to a seventh joining point which joins the base electrode of the fifth transistor and the sixth resistance joined to an eighth joining point which are connected to the fourth resistance and a ninth joining point being connected to the collector electrodes of the fifth and sixth transistors; the emitter electrode of the fifth transistor is connected to a tenth joining point which joins the seventh resistance grounded and the base electrode of the sixth transistor, the voltage of the emitter electrode of the sixth transistor being approximately 12 volts.

17. A system for the protection and security of cars, passengers and pedestrians, in accordance with claim 16, in which the white-light sensor is covered by a tube to guarantee its activation only by direct white bright-light and preventing lateral light from coming in; and the fourth resistance is a variable resistor connected to the white-light sensor, wherein the fourth resistance can be adjusted to adjust the sensitivity of the sensor, such that the white-light sensor will only detect and respond to blinding direct white light.

18. A system for the protection and security of cars, passengers and pedestrians, in accordance with claim 17, in which the first housing for the green-light bulb, and the second housing for the second red-light bulb are visible from in front of the vehicle; and the third housing for the third white-light bulb is visible from behind the vehicle.

19. A system for the protection and security of cars, passengers and pedestrians, in accordance with claim 18, in which the first and second housings are installed over the rearview mirror.

20. A system for the protection and security of cars, passengers and pedestrians, in accordance with claim 19, in which the first, second and third bulbs are of 18 watts.

21. A system for the protection and security of cars, passengers and pedestrians, in accordance with claim 19, in which the sensor circuit is located in the third housing, and is mounted on the vehicle's rear windshield.

* * * * *